Dec. 30, 1952 J. J. SCHULZE 2,623,538
LIQUID LEVEL CONTROL
Filed Nov. 12, 1948 2 SHEETS—SHEET 1

INVENTOR.
JOHN J. SCHULZE
BY
Campbell, Brumbaugh, Free & Graves
ATTORNEYS

Dec. 30, 1952 J. J. SCHULZE 2,623,538
LIQUID LEVEL CONTROL
Filed Nov. 12, 1948 2 SHEETS—SHEET 2

INVENTOR.
JOHN J. SCHULZE
BY
Campbell, Brumbaugh, Free & Graves
ATTORNEYS

Patented Dec. 30, 1952

2,623,538

UNITED STATES PATENT OFFICE 2,623,538

LIQUID LEVEL CONTROL

John J. Schulze, Chicago, Ill., assignor to Charles Bruning Company, Inc., New York, N. Y., a corporation of New York Application November 12, 1948, Serial No. 59,574

1 Claim. (Cl. 137—453)

The present invention relates to a liquid level control device which provides a convenient and practical means for filling a container with liquid to a pre-selected level and which prevents the liquid from draining back into the supply reservoir when the container is emptied.

In apparatus of the general character used in the development of sensitized paper that has been printed photographically, for example, difficulty has been encountered heretofore in effectively controlling the liquid developer level in the container in which the applicator rollers revolve. In addition, it has been difficult to drain the contaminated developer from the container without mixing it with the fresh developer in the supply reservoir.

It is an object of the present invention to provide an improved liquid level control by means of which the liquid flow to and from a container may be controlled, and the liquid prevented from flowing back into the supply reservoir when the container is emptied.

This object, as well as others which will be apparent from the following detailed description, is attained by means of a movable supply tank having a vent tube therein, the liquid level in a container associated therewith being controlled by the height of the liquid in the vent tube and the position of the supply tank.

The invention may be better understood from the following description taken in conjunction with the accompanying drawings, in which.

Figure 1:
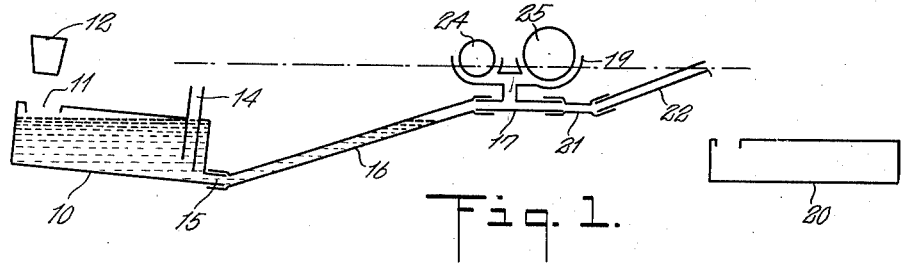
Figure 1 is a representation of a liquid level control device constructed in accordance with the present invention, showing the supply tank in position to be filled.
Figure 2:
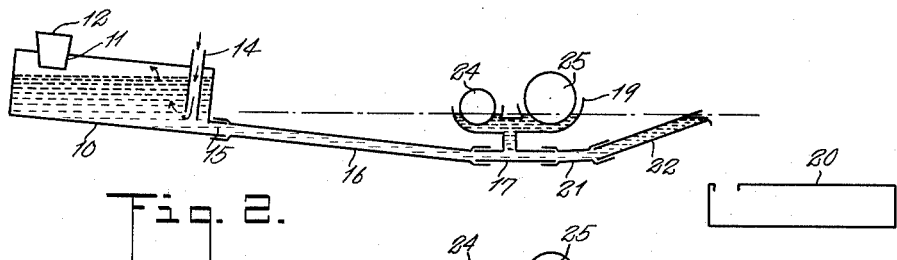
Figure 2 is a representation of the device of Figure 1, showing the supply tank in position to fill the container.
Figure 3:
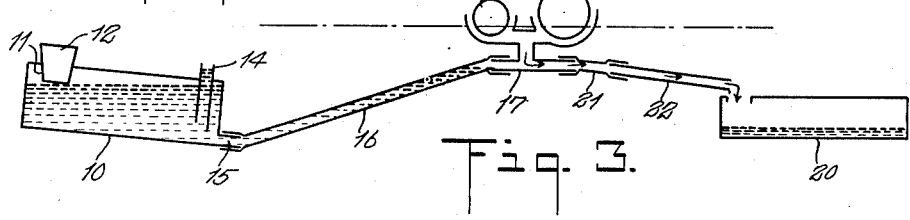
Figure 3 is a representation of the device of Figure 1, showing the supply tank in position to drain the container.
Figure 4:
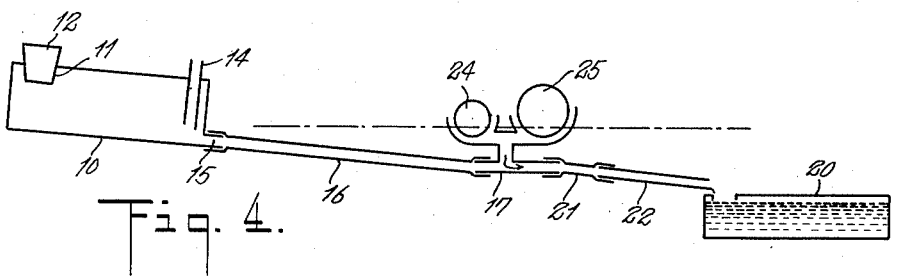
Figure 4 is a representation of the device of Figure 1, showing the supply tank in position to drain the entire system.

Typical components of the liquid level control device are represented in Figures 1, 2, 3 and 4. A tank 10 provided with an inlet port 11 having a closure 12 therefor serves to hold the liquid supply. Adjacent one end of the tank 10 is a vent tube 14 and outlet port 15, conduits 16 and 17 connecting the outlet port 15 to a container 19. A drain tank 20 receives the contaminated liquid from the container 19 through conduits 21 and 22. In a typical embodiment, more fully described hereinafter, the liquid is a developing solution, applicator rollers 24 and 25 providing contact with sensitized paper (not shown).

Figure 7:
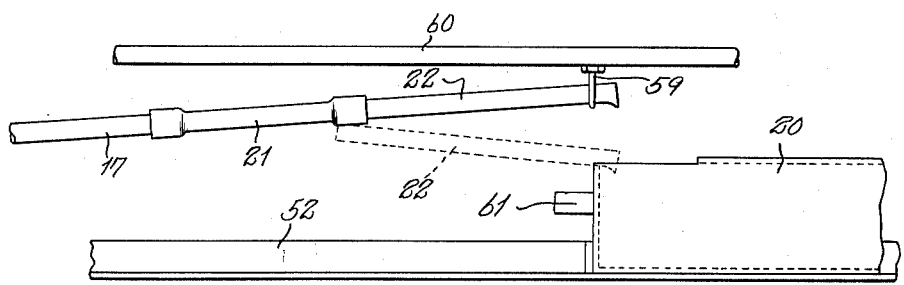
Figure 7 is a view, in modified scale, of the drain mechanism used in conjunction with the apparatus of Figure 5.
Figure 5:
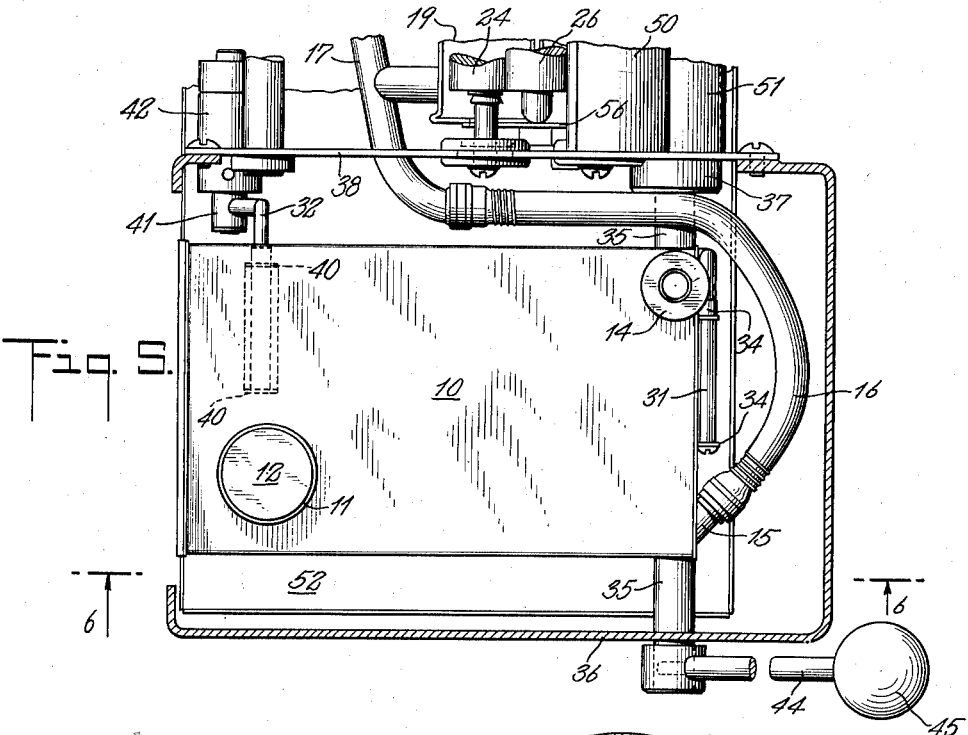
Figure 5 is a plan view of a developing apparatus utilizing a liquid level control device constructed in accordance with the present invention.
Figure 6:
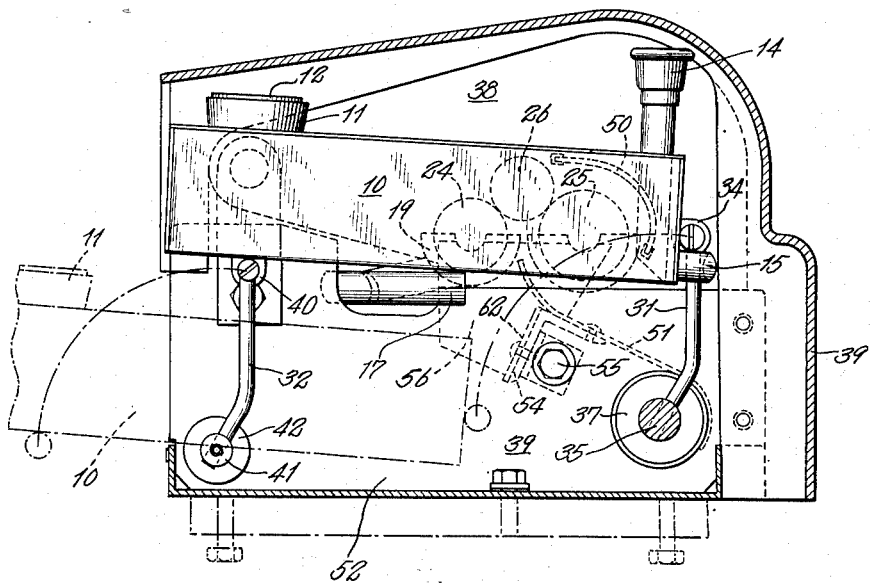
Figure 6 is a view in end elevation of the apparatus of Figure 5, taken at line 6—6 and looking in the direction of the arrows.

Referring now to Figures 5, 6 and 7, the supply tank 10 is mounted in a developing apparatus 30 by means of swinging arms 31 and 32. Arm 31 is journaled in lugs 34 affixed to one end of the tank 10, and is secured to a rotatable shaft member 35, a frame 36 and bushing 37 serving as supports therefor. Lugs 40 on the under-surface of the tank 10 journal one end of arm 32, the other end being secured to the shaft 41 journaled in a bushing 42. To facilitate movement of the tank 10, shaft 35 has an arm 44 and a knob 45 secured thereto.

To prevent any excess liquid that may collect on the applicator and container assembly from falling on the apparatus, deflecting plates 50 and 51 are provided, auxiliary drain basin 52 serving to receive the overflow.

An angle bar 54 which is bolted to the side plate member 39 at 55 supports one end of deflecting plate 51, the other end thereof extending over bushing 37. Suitably affixed to one end of container 19 is a plate member 56, angle bar 54 supporting a flange 62 formed thereon.

A movable conduit 22 is provided through which the contaminated developer solution flows into the drain tank 20. During normal operation drainage is prevented by maintaining the outlet of conduit 22 sufficiently high (as illustrated in Figure 1). This is accomplished by means of a hook 59, secured to a frame member 60 of the apparatus. To facilitate the removal and emptying of tank 20, a handle 61 is provided thereon.

In operation, tank 10 is lowered into the position represented by the broken lines in Figure 6 by moving arm 44. The developer solution is poured into inlet port 11 and closure 12 placed thereon. As tank 10 is raised, the liquid flows from outlet port 15 through conduits 16 and 17 to container 19. Air flows through the vent tube 14 when tank 10 is moved in an upward direction, and the liquid level in the container 19 is determined by the position of the inner end of the tube 14 with respect thereto. To prevent overflow of the liquid into the drain tank 20 when filling the container, drain conduit 22 is positioned as shown by the solid lines in Figure 7. In a typical developing operation, the liquid depth in the container 19 may be approximately ¼ inch when the applicator rollers 24, 25 and 26 are in a raised position.

When the developer solution in container 19 becomes contaminated either by oxidation or by small particles of paper fiber, for example, conduit 22 is placed in a position represented by the broken lines in Figure 7 and tank 10 is lowered until the liquid level in vent tube 14 is in the plane of the lower surface of conduit 17, or in the plane of the bottom of the container when the drain is directly connected thereto. An effective air lock is developed and maintained in tank 10 during the operation, and the contaminated liquid is prevented from draining back into the supply tank.

When it is desired to drain the entire system, tank 10 is positioned so that the inner end of vent tube 14 is in the plane of the liquid level in container 19. After the supply is replenished, the system is again ready for operation.

From the foregoing, it is apparent that the present invention provides a new and improved liquid level control device wherein a container may be filled with liquid to a predetermined level and emptied therefrom without affecting the fresh supply. Obviously, the device may be effectively used whenever a sensitive liquid control is desired.

It is to be understood that the specific embodiment described above may be modified within the scope of the invention. The invention is not to be limited, therefore, save as defined in the appended claim.

I claim:

A valveless liquid-level control system for periodically admitting a given charge of liquid to a container and subsequently draining it therefrom independently of the admitting system including a vertically movable closed supply tank having random liquid levels therein, a vent pipe movable with said tank and extending downward into the tank, said vent having an opening below the lower random liquid level of the tank and an opening at the atmosphere, closed conduit means joining said tank and said container at points beneath their respective operating liquid levels, means for varying the relative heights of said tank and said container between operative and inoperative positions, the quantity of liquid flowing from the tank to the container at such times as they are disposed in their relative operative positions being determined by the height of the lower opening of the vent pipe relative to the liquid level of the container, a drain member on the container having its discharge end adapted to be moved between operative and inoperative positions respectively below and above the liquid levels in the container, said closed tank providing a liquid lock preventing a reverse flow of liquid from the container to the tank when the latter is disposed in its operative position with the liquid level beneath that of the container, and second conduit means joining said drain member and said closed conduit means, said tank being drainable through said drain member by concurrently disposing the tank and drain member in their operative positions.

JOHN J. SCHULZE.

REFERENCES CITED

The following references are of record in the file of this patent:

UNITED STATES PATENTS

| Number | Name | Date |
|---|---|---|
| 328,749 | Bates | Oct. 20, 1885 |
| 356,511 | Turner | Jan. 25, 1887 |
| 800,491 | Riddick | Sept. 26, 1905 |
| 1,286,821 | Speer | Dec. 3, 1918 |
| 1,412,620 | Lacke | Apr. 11, 1922 |
| 1,477,365 | Kiefer | Dec. 11, 1923 |
| 1,878,836 | Fowler | Sept. 20, 1932 |